(12) United States Patent
Vilmart et al.

(10) Patent No.: US 8,136,583 B2
(45) Date of Patent: Mar. 20, 2012

(54) METHOD FOR PROVIDING AN OPTIMUM HEAT EXCHANGE WITHIN AN ASSEMBY CONSISTING OF A HEAT-CONDUCTING ABSORBING PLATE AND A HEAT TRANSFER FLUID

(76) Inventors: Roland Vilmart, Saint Peray (FR); Vincent Vilmart, Soyons (FR)

( * ) Notice: Subject to any disclaimer, the term of this patent is extended or adjusted under 35 U.S.C. 154(b) by 1159 days.

(21) Appl. No.: 11/909,352

(22) PCT Filed: Mar. 20, 2006

(86) PCT No.: PCT/FR2006/000650
§ 371 (c)(1),
(2), (4) Date: Sep. 21, 2007

(87) PCT Pub. No.: WO2006/100393
PCT Pub. Date: Sep. 28, 2006

(65) Prior Publication Data
US 2008/0277096 A1 Nov. 13, 2008

(30) Foreign Application Priority Data
Mar. 21, 2005 (FR) .................................. 05 02752

(51) Int. Cl.
*F28F 3/14* (2006.01)
*F25B 29/00* (2006.01)
(52) U.S. Cl. ......................... 165/170; 165/48.2; 126/651
(58) Field of Classification Search .................. 165/170, 165/48.2, 49, 53; 126/651, 658, 660, 661, 126/663, 675, 639
See application file for complete search history.

(56) References Cited

U.S. PATENT DOCUMENTS

| 3,076,450 | A | * | 2/1963 | Gough et al. ................. 126/672 |
| 3,734,178 | A | * | 5/1973 | Soudron ....................... 165/170 |
| 4,002,200 | A | * | 1/1977 | Raskin .......................... 165/131 |
| 4,031,881 | A | * | 6/1977 | Thiel ............................ 126/664 |
| 4,156,419 | A | * | 5/1979 | Lewis, Sr. .................... 126/667 |
| 4,207,867 | A | | 6/1980 | Hanks |
| 4,243,020 | A | * | 1/1981 | Mier ............................ 126/670 |
| 4,244,355 | A | | 1/1981 | Stout et al. |
| 4,324,028 | A | * | 4/1982 | Severson ................. 29/890.033 |
| 4,432,414 | A | | 2/1984 | Morgan et al. |
| 5,323,763 | A | * | 6/1994 | Lechner ....................... 126/626 |
| 6,536,516 | B2 | * | 3/2003 | Davies et al. ................. 165/170 |
| 2004/0238162 | A1 | * | 12/2004 | Seiler et al. ................... 165/148 |

FOREIGN PATENT DOCUMENTS

EP 0979981 A 2/2000
JP 60144560 A * 7/1985

* cited by examiner

Primary Examiner — Tho V Duong
(74) Attorney, Agent, or Firm — Browdy and Neimark, PLLC

(57) ABSTRACT

The invention relates to a method of optimising heat exchanges between (i) a thermally-conductive absorbent plate (1) which is exposed to thermal radiation and a heat-transfer fluid (3) circulating in at least one thermally-conductive conduit tube (2) that is in thermal contact with the plate (1) and (ii) within the heat-transfer fluid (3). The invention is characterized in that, in order to promote heat exchanges, the method uses zones of the aforementioned plate (1) in order to form part of the wall of the conduit tube (2), such that the heat-transfer fluid (3) is in direct contact with the plate (1) so as to reduce the thermal resistance between the plate (1) and the heat-transfer fluid (3) circulating inside the conduit tube (2), said conduit tubes (2) being disposed on the two faces of the plate (1) and being interconnected by means of holes (4) that provided on the plate.

8 Claims, 2 Drawing Sheets

METHOD FOR PROVIDING AN OPTIMUM HEAT EXCHANGE WITHIN AN ASSEMBY CONSISTING OF A HEAT-CONDUCTING ABSORBING PLATE AND A HEAT TRANSFER FLUID

BACKGROUND OF THE INVENTION

1. Field of the Invention

The object of the present invention is a method for providing optimum heat exchange within an assembly consisting of a heat-conducting absorbing plate and a heat transfer fluid flowing in at least one heat-conducting tubular conduit. It is notably, but not exclusively, applied to collectors of solar heat panels.

2. Description of the Prior Art

It is known that collectors of solar heat panels comprise:
a plate, generally in copper or in aluminum, the upper face of which is coated with a selective layer promoting absorption of solar light;
tubing having a circular shaped section which is welded on the lower face of said plate, this tubing generally being in copper or in aluminum;
a heat transfer liquid flowing in the tubing.

In this way, solar light incident on the upper face of said plate is converted into heat, the latter being conducted towards the welding area and then to the walls of the tubing so as to be transmitted to the heat transfer liquid which heats up while it passes in said tubing.

This device nevertheless has the following drawbacks:
transmission of heat from the wall of a tubing towards the heat transfer liquid is optimum when the temperature difference between said wall and the heat transfer liquid is large or, in the vicinity of the wall, the temperature of the heat transfer liquid is close to that of this wall;
as the heat transfer liquid is not as good a heat conductor as copper, transmission of the heat of the liquid located in the vicinity of the wall of a tubing towards the centre of the liquid is not optimum.

Thus, the flow of the heat transfer fluid in the tubing is laminar and the temperature distribution is not uniform, indeed, the temperature of the heat transfer liquid decreases from the upper layers located in proximity to the wall of a tube towards the centre of the liquid, consequently, the heat exchanges within the heat transfer liquid and between the tubing and the heat transfer liquid are not optimum.

OBJECT OF THE INVENTION

More particularly, the invention has the object of suppressing these drawbacks by proposing a method for optimizing heat exchanges:
between a heat-conducting absorbing plate exposed to heat radiation and a heat transfer fluid flowing in at least one heat-conducting tubular conduit in thermal contact with said plate and;
within said heat transfer fluid.

SUMMARY OF THE INVENTION

For this purpose, it proposes a method for optimizing heat exchanges between a heat-conducting absorbing plate exposed to heat radiation and a heat transfer fluid flowing in at least one heat-conducting tubular conduit in thermal contact with said plate as well as within the heat transfer fluid, characterized in that in order to promote heat exchanges, it consists of using areas of said plate for forming a portion of the wall of said conduit so that the heat transfer fluid is in direct contact with said plate in order to reduce thermal resistance between the absorbing plate and the heat transfer liquid flowing inside said conduit.

Advantageously, the conduits may be positioned on both faces of the plate, they may then communicate with each other through ports with which meandering paths may be generated which thus constrain the heat transfer liquid to sudden changes in direction during its passage into these ports which enhances turbulences and provides mixing of the heat transfer liquid thereby promoting uniformization of temperatures and reduction of the laminar effect.

Advantageously, a material absorbing heat radiation may be applied on one of the two faces of said plate as well as possibly on the external walls of said conduits located on this face.

The conduits may notably be positioned on said plate "as a harp" or "as a coil".

Advantageously, the conduits may consist of profiled members having a longitudinal central concavity edged with two opposite side wings which substantially extend over a same plane, both of these side wings being sealably attached on one face of the plate. Further, the concavities of these profiled members may be closed at their ends by bulging transverse walls provided with a rim which extends in the aforesaid plane, in the extension of the aforesaid side wings.

By attaching the conduits on the plate at said side wings, it is advantageously possible to extend the direct contact area between a conduit and the plate, thereby optimizing heat conduction.

Said ends of the profiled members forming the conduits will advantageously be positioned facing said ports.

BRIEF DESCRIPTION OF THE DRAWINGS

An embodiment of the invention will be described hereafter, as non-limiting examples, with reference to the appended drawings wherein.

DESCRIPTION OF THE PREFERRED EMBODIMENTS

Figure 1:
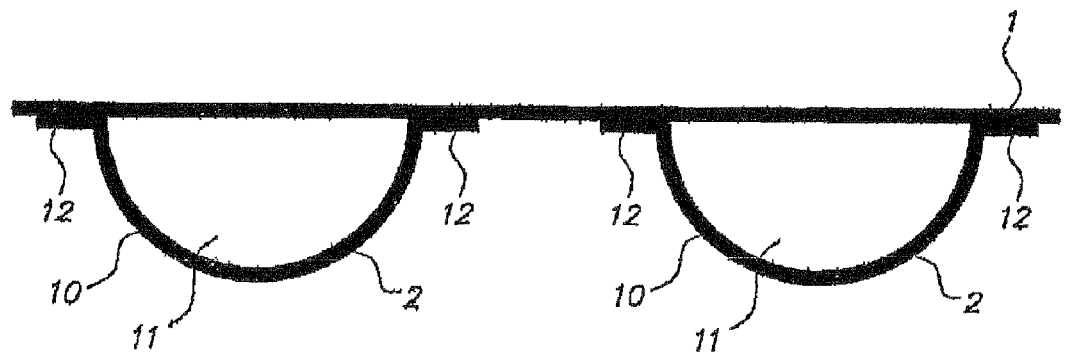
FIG. 1 is a sectional view of an assembly arranged in accordance with the application of the method according to the invention and comprising a plate on which tubular conduits are attached.
Figure 2:
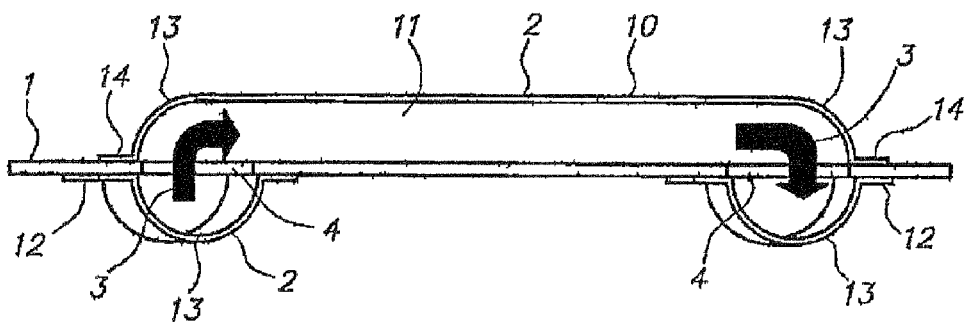
FIG. 2 is a sectional view showing the flow of the fluids within an assembly of the aforesaid type which consists of a plate and tubular conduits.
Figure 3:
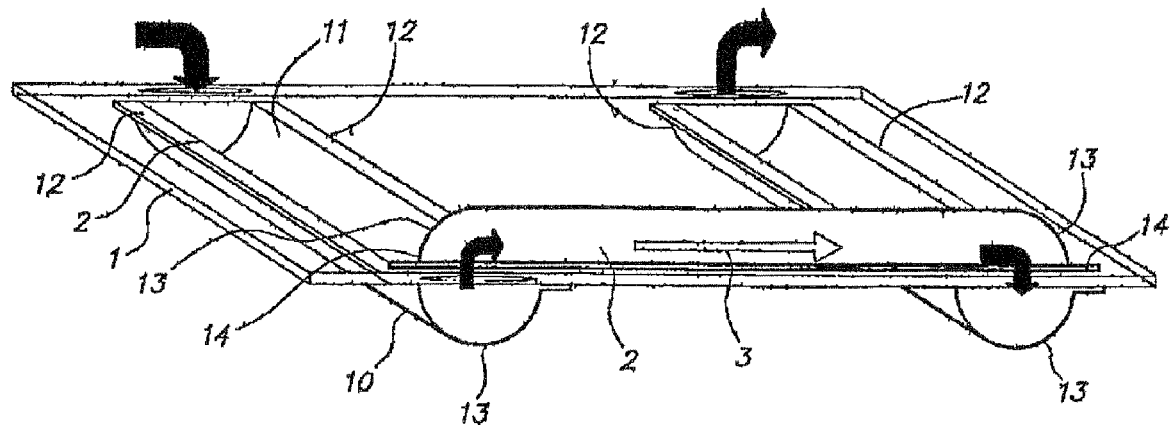
FIG. 3 is a sectional view showing the flow of the fluids within an assembly of the aforesaid type formed with a plate on which tubular conduits are arranged as coil.
Figure 4:
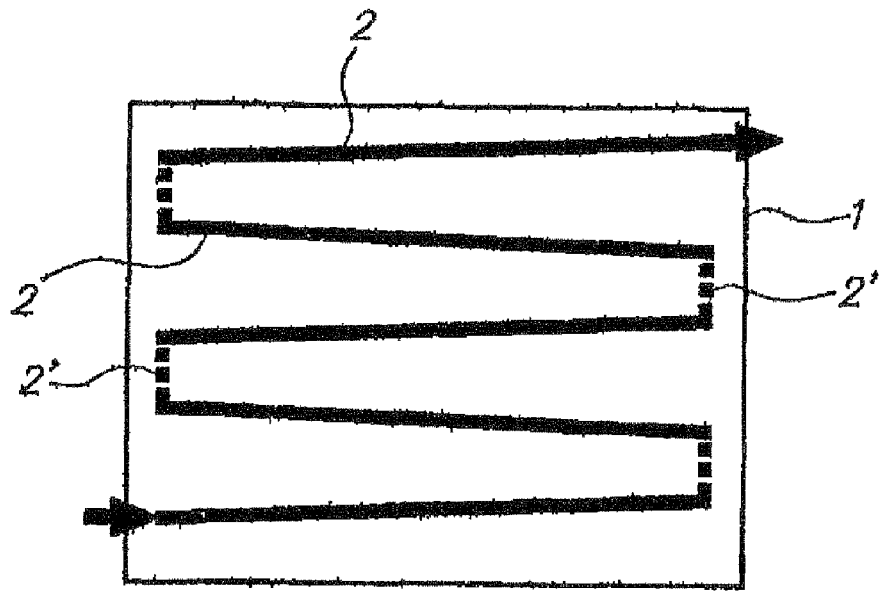
FIG. 4 is a schematic view of an assembly of the aforesaid type comprising a plate on which the conduits are deposited as a coil.

In this example, the method according to the invention consists of positioning on a heat-conducting absorbing plate 1, heat-conducting tubular conduits 2 in which a heat transfer fluid 3 flows (schematically illustrated in FIGS. 2 and 3 by arrows), the positioning of the tubular conduits 2 on the plate 1 is performed in such a way that areas of the plate 1 form a portion of the wall of said conduits 2 so as to allow the heat transfer fluid 3 to be in direct contact with said plate 1 thereby reducing the thermal resistance between the plate 1 and the heat transfer fluid 3 flowing inside said conduits 2.

For this purpose, each tubular conduit 2 may consist of a profiled member 10 having a longitudinal central concavity 11 edged with two opposite side wings 12 which substantially extend in a same plane, both of these side wings 12 being sealably attached onto one face of the plate 1.

Advantageously, by attaching the conduits on the plate 1 at the side wings 12, the area of direct contact between conduit 2 and the plate 1 may be extended, thereby optimizing heat conduction.

Attachment of the conduits 2 on the plate 1 which is carried out at the side wings 12 may notably be achieved by welding or brazing or adhesive bonding.

Advantageously, as this is illustrated in FIGS. 2-5, the conduits 2 may be positioned on both faces of the plate 1; in this case, the plate 1 will comprise ports 4 facing which the ends of the conduits 2 will be positioned; in this way, the heat transfer liquid 3 flowing in the conduits 2 will be constrained to sudden changes in direction during its passage into the ports 4 which will provide enhancement of turbulences and mixing of said liquid 3 thereby promoting uniformization of temperatures and reduction of the laminar effect.

In order to optimize the mixing of the heat transfer liquid 3 during its passage in the ports 4, the concavities 11 of the profiled members 10 may be closed at their ends by bulging transverse walls 13 provided with a rim 14 which extends in the plane of the side wings 12, in their extension.

Figure 5:
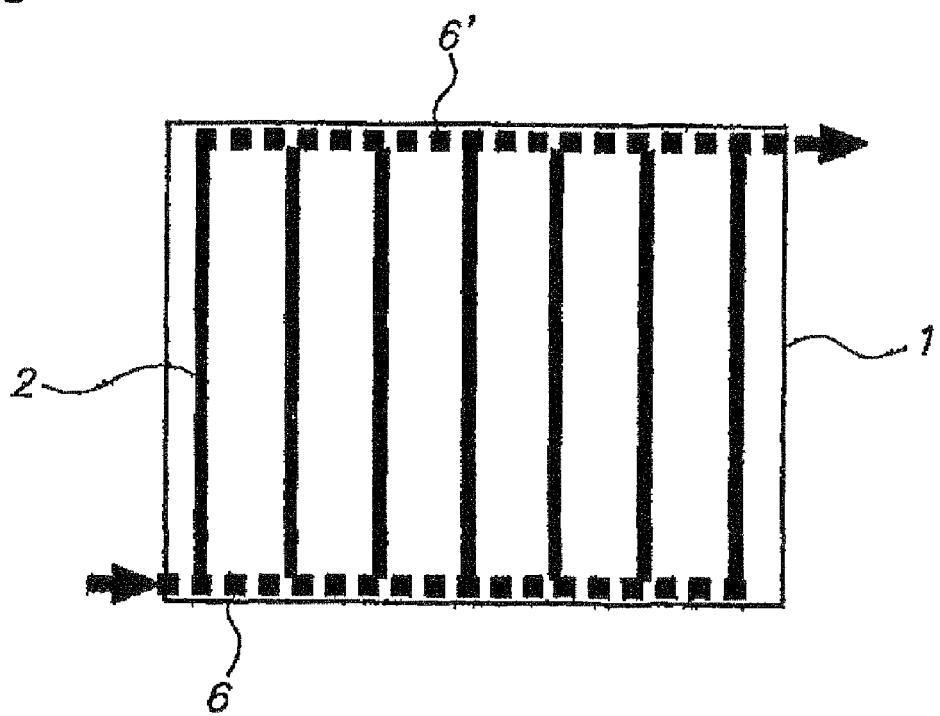
FIG. 5 is a schematic view of an assembly of the aforesaid type comprising a plate on which the conduits are arranged as a harp.

The conduits 2 may be notably positioned on said plate 1:

as harps: as this is illustrated in FIG. 5, the conduits 2 are placed in parallel at equal distances, on a face of said plate 1. One of the ends of each of the conduits 2 communicates via a port of the aforesaid type with a single inlet conduit 6 formed by a profile which extends at right angles on the other face of the plate 1, the other end of each of the conduits 2 communicates via a port 4 of the aforesaid type with an outlet conduit 6' formed by a profile which extends at right angles on the other face of the plate 1. The operation of this device is then the following: the inlet conduit 6 distributes the heat transfer liquid 3 into the heat exchange conduits 2; during its passage in these conduits 2, the heat transfer liquid 3 absorbs the calories stored by the plate 1 under the effect of solar radiation; once it is heated up, this heat transfer fluid 3 is recovered for use by the outlet collector conduit 6'.

As a coil: conduits 2 are placed two by two quasi in parallel on one face of the plate 1, these conduits 2 being connected through junction conduits 2' transversely positioned on the other face of the plate 1 and with which they communicate via ports 4 of the aforesaid type, thus, the heat transfer liquid which flows in the conduits 2 will be constrained to sudden changes in direction during its passage in the junction conduits 2' so that turbulences may be enhanced within this liquid 3.

Advantageously, in order to increase the heat radiation absorption capacities of the assembly formed by a plate 1 and tubular conduits 2, a material absorbing heat radiation may be applied on one of the two faces of said plate as well as possibly on the external walls of said conduits 2 located on this face.

The absorbing plate 1 will preferably be in copper or aluminum.

Preferentially, the conduits 2 will have a thickness between 0.2 and 0.3 millimeters and will be in copper.

The invention claimed is:

1. Device for optimizing heat exchanges:
   between a heat-conducting absorbing plate exposed to heat radiation and a heat transfer fluid flowing in at least one heat-conducting tubular conduit in thermal contact with said plate,
   and within the heat transfer fluid,
   in order to promote heat exchanges,
   wherein areas of said plate form a portion of the wall of said conduit so that the heat transfer fluid is in direct contact with said plate so as to reduce the thermal resistance between the plate and the heat transfer liquid flowing inside said conduit;
   the conduits being positioned on both faces of the plate and communicating with each other via ports made on the plate so as to impose to the heat transfer liquid a meandering path thereby providing homogenization of the temperature of the heat transfer fluid and reduction of the laminar effect;
   an absorbing heat radiation material is applied on one of the two faces of said plate as well as on the external walls of said conduits located on this face;
   each tubular conduit consists of a profiled member having a longitudinal central concavity edged with two opposite side wings which substantially extend in a same plane, both of said side wings being sealably attached on one face of the plate;
   wherein the concavities of the profiled members are closed at their ends with bulging transverse walls provided with a rim which extends into the plane of the side wings, in their extension.

2. The device according to claim 1, wherein said conduits are arranged as a coil or as harps.

3. The device according to claim 2, wherein:
   when the conduits are arranged as harps, they are placed in parallel, at equal distances, on one face of said plate, one of the ends of each of the conduits communicates via a port of the aforesaid type with a single inlet conduit formed by a profile which extends at right angles on the other face of the plate, the other end of each of the conduits communicates via a port of the aforesaid type with an outlet conduit formed by a profile which extends at right angles on the other face of the plate.

4. The device according to claim 3, wherein the attachment of the conduits on the plate carried out at the side wings is achieved by welding or brazing or adhesive bonding.

5. The device according to claim 2, wherein, when the conduits are arranged as a coil, they are placed two by two quasi in parallel on one face of the plate, said conduits being connected through junction conduits transversely positioned on the other face of the plate and with which they communicate via ports.

6. The device according to claim 1, wherein the absorbing plate is of copper or aluminum.

7. The device according to claim 1, wherein the tubular conduits have a thickness between 0.2 and 0.3 millimeters and are of copper.

8. A method for optimizing heat exchanges:
   between a heat-conducting absorbing plate exposed to heat radiation and a heat transfer fluid,
   and within the heat transfer fluid, in order to promote heat exchanges, comprising the step of:
   allowing said heat transfer fluid to flow in at least one heat-conducting tubular conduit of the device according to claim 1.

* * * * *